(No Model.)

H. J. DURGIN.
TABLE LEAF SUPPORT.

No. 264,518. Patented Sept. 19, 1882.

Attest:
M. D. Phillips.
Martha A. Phillips.

Inventor:
H. J. Durgin.
By E. B. Whitmore, Atty.

UNITED STATES PATENT OFFICE.

HENRY J. DURGIN, OF ROCHESTER, NEW YORK.

TABLE-LEAF SUPPORT.

SPECIFICATION forming part of Letters Patent No. 264,518, dated September 19, 1882.

Application filed May 19, 1882. (No model.)

*To all whom it may concern:*

Be it known that I, HENRY J. DURGIN, of Rochester, in the county of Monroe and State of New York, have invented a new and useful Improvement in Table-Leaf Supports, which improvement is fully set forth in the following specification and accompanying drawings.

The object of my invention is to produce a support for a table-leaf, consisting of two arms pivoted together at their ends and having their opposite ends attached respectively to the under surface of the leaf and to the rail, a locking device being provided, by means of which, when the leaf is raised to place, the arms become mutually locked, and together form a rigid support or brace for the leaf.

Figure 1:
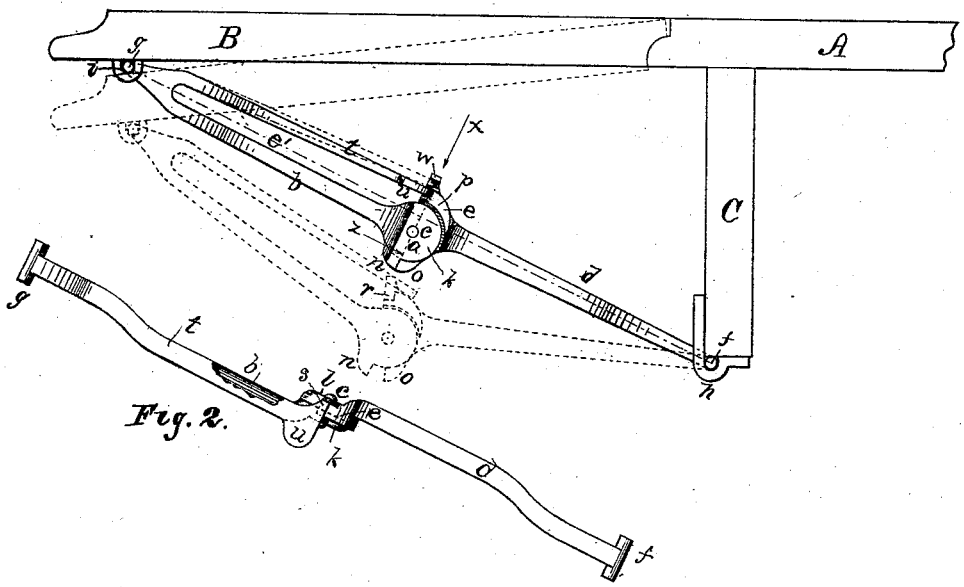
Figure 2:

Referring to the drawings, Figure 1 is a view at the end of the table, showing in full lines the leaf raised to a horizontal position, with the support in place, and a dotted position of said leaf and support; Fig. 2, a side view of the support, seen as indicated by the arrow $x$ in Fig. 1; and Fig. 3, drawn to a larger scale, a cross-section of parts of the joint, taken upon the dotted line $a$ in Fig. 1, and viewed as indicated by the arrow $z$ in said figure.

In the figures, A is the top board of a table, B the leaf, and C the rail, all of ordinary construction.

Figure 3:
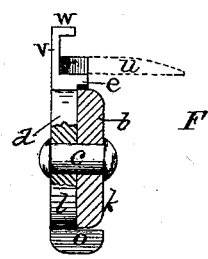

$b$ and $d$ are two arms, which, pivoted together at their ends by the pin $c$, constitute the support for the leaf. The arm $d$ is provided at its opposite end with a cross-piece, $f$, which is inserted and held in a simple rest, $h$, attached to the rail, and the arm $b$ is provided at its end with a similar cross-piece, $g$, held in a simple loop or rest, $i$, attached to the under surface of the leaf. The arms $b$ and $d$, at the ends joined together, are shaped into flat circular heads $k$ and $l$, respectively, said heads being provided respectively at their peripheries with opposing jaws $n$ and $o$. The jaw of either head projects across the edge of the other, as shown in Fig. 3, and when the leaf is raised to a horizontal position and the arms together assume a position forming substantially a right line, as shown in Fig. 1, the said jaws meet and prevent any further upward motion of the joined ends of the arms. The arm $b$ is bifurcated, one branch, $t$, of which has a free end, $s$, near the head $k$, which free end, upon being moved away from the head by any means, returns to its normal position from its own elasticity when left to itself. The end $s$ of the tine $t$ is turned laterally, so as to reach over the edge of the head $l$ of the arm $d$, as shown in Fig. 2. The head $l$ is enlarged at $p$, and provided thereat with a lateral projecting piece, $e$, in the shape of a half-crescent. At its thick end this piece $e$ is provided with a notch, $r$, adapted to receive the end $s$ of the tine $t$, which latter, by its lateral deflection above mentioned, reaches over said piece $e$. As the leaf is lowered the support folds at the middle on account of the flexible joint at $c$, and when said leaf is raised to a horizontal position the arms of the support together form a straight line, as above stated. As the leaf in its upward motion approaches its horizontal position the end $s$ of the tine will ride or move over the convex surface of the piece $e$ toward the notch $r$, which latter is relatively so made in the piece $e$ that the said end $s$ of the tine will reach and drop into said notch simultaneously with the meeting of the jaws $n$ and $o$, as above described. When the end of the tine drops into the notch the arms $b$ and $d$ are locked rigidly into position on account of the bearings at the end of the tine and between the jaws, and when thus locked the support will in consequence resist any lateral strain applied in a vertical plane—as, for instance, in the direction of the arrow $x$—or a downward pull upon the support. The leaf can only be let down by raising the end of the tine out of the notch and allowing the support to bend downward at the joint, as appears in dotted position in Fig. 1.

The tine $t$ is widened at its end for the purpose of forming a rest, $u$, for the thumb, by means of which a person grasping the arm $d$ with the hand may press the thumb against the under side of said rest and raise the tine out of the notch, and so unlock the support for the purpose of dropping the leaf.

An arm, $v$, reaches upward from the head $l$, having at its upper end a horizontal projection, $w$, reaching over the end $s$ of the tine, which projection forms a guard or stop for the tine to prevent the same being raised by the thumb, as above described, unnecessarily away from the piece $e$ in the act of unlocking the support.

When the support is in position under the horizontal leaf, as shown in full lines in Fig. 1, the bearing of the jaws $n$ and $o$ against each other is below the line drawn between the extreme ends $f$ and $i$ of the support, (shown by the broken line $e'$,) and the bearing at the end of the tine $t$ is above said line $e'$. On account of the line $e'$ lying between the said bearings, the weight of the leaf upon the support will be sustained by said two bearings and the pin $c$. The arms each have an offset bend, as shown in Fig. 2, so that they may fold or double by each other when the leaf is lowered.

I claim as my invention—

1. In a table-leaf support, the arm $d$ and bifurcated arm $b$, united in a flexible joint at $c$, the arm $d$ being provided with the piece $e$ and notch $r$, to operate in combination with the tine $t$ of the arm $b$ in locking said arms together, the said tine being provided with a thumb-rest, $u$, for lifting it out of the notch for the purpose of unlocking the said arms, substantially as set forth.

2. A table-leaf support consisting of the arms $d$ and $b$, joined at $c$, the former being provided with the piece $e$ and notch $r$, and the latter arm, $b$, provided with the branch or tine $t$, operating with said piece and notch, and provided with a thumb-rest, $u$, and a guard or stop, $w$, for the tine $t$, substantially as shown and described.

HENRY J. DURGIN.

Witnesses:
E. B. WHITMORE,
M. M. NIER.